(No Model.)
C. W. HELDEN.
CHECKING DEVICE.
No. 566,577. Patented Aug. 25, 1896.
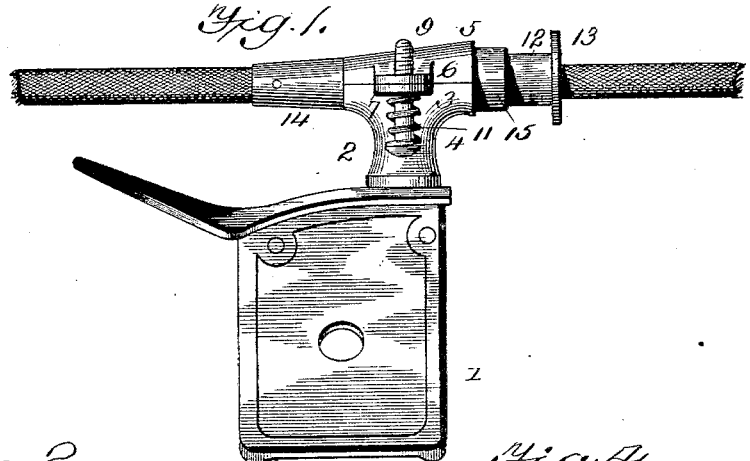
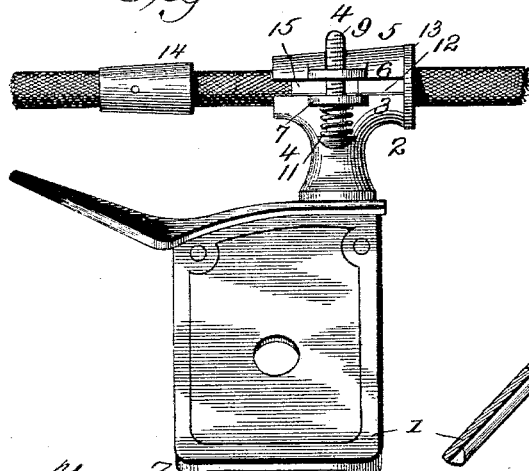
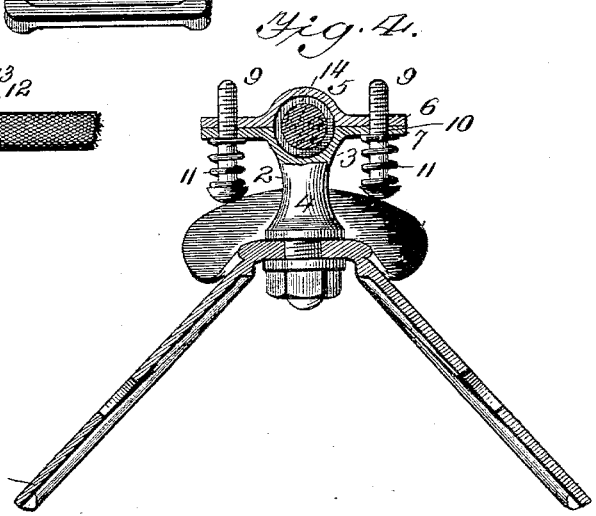
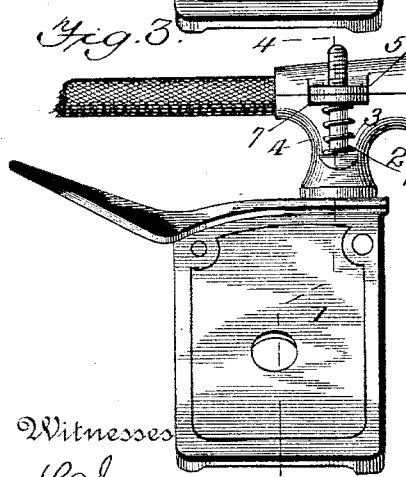
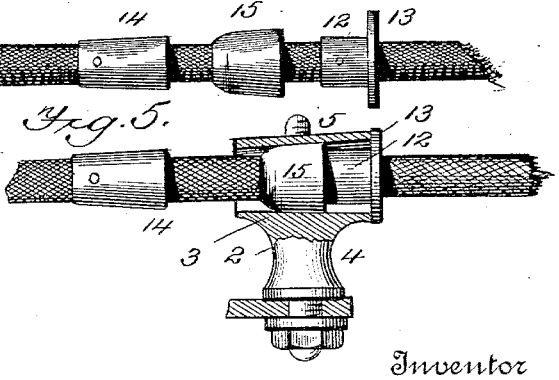
Witnesses
Inventor
Charles W. Helden
By Francis M. Wright
Attorney

UNITED STATES PATENT OFFICE.

CHARLES W. HELDEN, OF FLORENCE, ALABAMA.

CHECKING DEVICE.

SPECIFICATION forming part of Letters Patent No. 566,577, dated August 25, 1896.

Application filed April 25, 1896. Serial No. 589,079. (No model.)

*To all whom it may concern:*

Be it known that I, CHARLES W. HELDEN, a citizen of the United States, residing at Florence, in the county of Lauderdale and State of Alabama, have invented certain new and useful Improvements in Checking Devices for Horses, of which the following is a specification.

My invention relates to devices for reining driving-horses so that the checkrein will be normally held taut and the horse's head reined up, and yet when it is desired to permit the horse to lower his head for drinking or other purposes it can be done without the necessity of the driver leaving his seat in the vehicle.

The object of my invention is to provide such a device whereby the checkrein can be speedily and conveniently released by a short directly-backward pull upon said rein, and then, when the horse has been watered, the checkrein can by another directly-backward pull be restored to its original position, in which it is held taut between the horse's mouth and the harness-saddle.

My invention therefore consists in the novel construction and combination of parts designed for the above purposes, the same being hereinafter fully specified, and particularly pointed out in the claims.

Referring to the drawings, Figure 1 is a side elevation of the device in its original position or when the checkrein is held taut. Fig. 2 is a similar view of the device in the position when the driver has pulled upon the checkrein to operate the device so as to permit the horse to drink. Fig. 3 is a similar view of the parts in the position when the checkrein, having been released, is pulled forward by the horse, as in drinking. Fig. 4 is a sectional view through the lines 4 4 of Fig. 3, and Fig. 5 is a longitudinal section of parts of the device in the same position as in Fig. 2.

1 represents the harness-saddle, upon which is mounted a two-part or sectional check or stay 2, comprising a lower stationary half-sleeve 3, mounted upon a suitable standard 4, secured to the harness-saddle, and an upper movable half-sleeve 5. Said half-sleeves 3 and 5 taper rearwardly, so as to form when united a frustum of a cone, and they are provided with upper and lower laterally-extending lugs 6 and 7, registering with each other.

The lugs 6 are screw-threaded to receive the screws 9, which pass freely through apertures 10 in the lower lugs 7 and are provided with compressed springs 11, which are confined between the lugs and the heads of the screws, and thus close the half-sleeves together.

The checkrein has fixedly secured thereto a collar 12, having a flange 13, and also fixedly secured a conical collar or stop 14, tapering toward the rear. There is also provided a sleeve or key 15, tapering toward the rear, as shown, the taper being slight in the forward portion of the key and more abrupt in the rearward portion. Said key 15 slides along the rein, its motion being limited by the collar 12 and the stop 14.

The operation of the device is as follows: The parts are normally in the position shown in Fig. 1, in which the rear stop 14, secured upon the checkrein, abuts against the rear of the stay 2, secured upon the harness-saddle, and thus holds the checkrein taut. In this position the rear portion of the key 15 is contained within the forward portion of the stay 2 without distending the same. The driver now draws strongly upon the check-rein, the effect of which is to force the rear or narrow end of the key into the rear of the stay, so that the key acts as a wedge to force the sections of the stay apart, as shown in Fig. 2. In this position the key 15 is held tightly within the stay 2, but the collar 12, being of less diameter than the forward portion of the key 15, is only loosely inclosed by the stay. Consequently when the horse is permitted to reach forward, as for drinking, the checkrein is readily drawn forward and the stop 14 will enter the rear end of the stay 2, which has been sufficiently expanded by the wedging action of the key 15, and will abut against the rear end of said key. The continued forward motion of the checkrein will carry the stop 14 through the stay 2, carrying along with it the key 15, and the parts will be in the position shown in Fig. 3. When the horse has been watered, the driver will pull upon the checkrein until the stop 14 enters the stay 2, the sections thereof separating to permit it to pass, and until the stop has passed through the stay, when the sections of the stay will immediately close behind and the parts will again assume the position shown in Fig. 1, it being only observed that, by reason of the abruptly-tapering rear portion of the key 15, said key will be carried along the rein by the stay until it abuts against the collar 12, and will not tend to expand the sections of the stay unless the driver continues to pull back the rein after the stay has passed the stop 14.

Having thus fully described my invention, what I claim, and desire to secure by Letters Patent, is—

1. In a device for checking and unchecking horses, the combination of a checkrein, a stop fixedly mounted thereon, an expansible or separable stay secured to the harness-saddle, normally limiting the forward movement of the rein by its abutment against said stop, but, when expanded, permitting said stop to pass said stay, and means, carried by the rein, for expanding said stay, said means being operated by a rearward pull of the rein, substantially as described.

2. In a device for checking and unchecking horses, the combination of a checkrein, a stop fixedly mounted thereon, an expansible or separable stay normally limiting the forward movement of the rein by its abutment against said stop, but, when expanded, permitting said stop to pass said stay, and a key carried by said rein and adapted, when said rein is pulled backward, to expand or separate said stay, substantially as described.

3. In a device for checking and unchecking horses, the combination of a checkrein, a stop fixedly mounted thereon, an expansible or separable stay normally limiting the forward movement of the rein by its abutment against said stop, and a key, sliding on said rein, limited as to its forward movement, and adapted, when said rein is pulled backward, to expand or separate said stay, whereby the stop can pass the stay in the forward movement of the rein, said stop in said forward movement releasing the key from the stay, substantially as described.

4. In a device for checking and unchecking horses, the combination of a checkrein, a rear stop fixedly mounted thereon, an expansible or separable stay normally limiting the forward movement of the rein by its abutment against said stop, a key sliding on said rein, and a forward stop on the rein limiting the forward movement of the key, said key when thus limited, being adapted to enter and expand the stay when the rein is pulled back, and said forward stop having a portion which limits said backward movement by its abutment against the stay, substantially as described.

5. The combination, with the checkrein, of the rear stop 14, the forward stop 12, the expansible stay 2, and the tapering key 15 sliding on the rein, and adapted to expand the stay, substantially as described.

6. The combination, with the checkrein, of the rear stop 14, the expansible stay 2, the tapering key 15 sliding on the rein and adapted to expand the stay, and the forward stop 12 having the abutment 13 for the stay, substantially as described.

In witness whereof I have hereunto set my hand this 23d day of April, 1896.

CHARLES W. HELDEN.

Witnesses:
R. T. SIMPSON, Jr.,
C. E. JORDAN.